Figure 2:
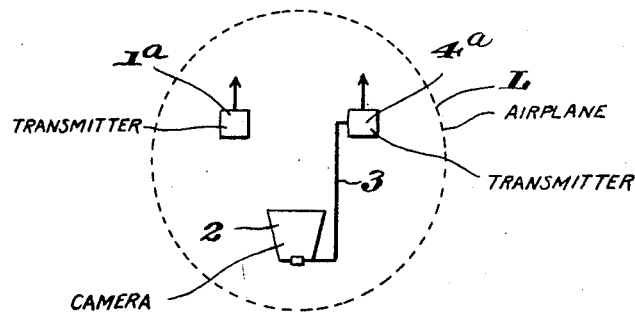

Jan. 23, 1951 M. PURANEN ET AL 2,539,270
METHOD OF MAGNETOGRAPHIC SURVEYING
Filed June 4, 1947

INVENTORS
M. Puranen
A. A. Kahma
BY Wenderoth, Lind & Ponack
ATTORNEYS

Patented Jan. 23, 1951

2,539,270

UNITED STATES PATENT OFFICE 2,539,270

METHOD OF MAGNETOGRAPHIC SURVEYING

Maunu Puranen and Aarno Assar Kahma, Helsinki, Finland

Application June 4, 1947, Serial No. 752,560
In Finland August 22, 1942

Section 1, Public Law 690, August 8, 1946
Patent expires August 22, 1962

2 Claims. (Cl. 175—182)

This invention relates to a method of surveying the earth's surface by magnetographs carried in vehicles such as airplanes or automobiles traveling at high speed. At present, magnetic observations are made at spaced points upon the earth's surface and the magnetometer operator must spend considerable time at each observation point which is slow and tedious. In order to locate these individual observation points definitely on a map it is indispensable to lay out such points preliminarily along exact traverses which is difficult and expensive particularly in deserts and uninhabited areas. It is an object of the invention to eliminate these difficulties.

A further object of the invention is to provide a method of magnetic surveying wherein magnetograms are secured from magnetographs carried by airplanes flying in a predetermined formation.

A still further object is to provide a method wherein the magnetographs are carried in airplanes flying near the earth's surface while the position of such airplanes relative to the earth's surface is fixed by other airplanes flying at a higher level.

A still further object is to fix the position of the magnetograph carrying airplanes relative to the earth's surface by means of aerial photography and to control the course of such airplanes.

Other objects will become apparent from the detailed description below.

In order to make magnetic measurements upon the earth's surface which are satisfactory from an economic and prospecting viewpoint it is indispensable that such measurements be made from vehicles moving at high speed.

This necessitates the use of automatic magnetographs because only such devices are capable of making a continuous record which will disclose slight irregularities or anomalies which may be highly important.

In principle any type of automatically recording magnetometer may be used providing the errors from vibrations due to the movement of the carrying vehicle are not too great. In addition, the vehicle itself should not constitute a source of appreciable magnetic disturbance. If it is impossible to construct a carrying vehicle sufficiently free from magnetic disturbances the magnetograph may be placed in a small auxiliary carrier constructed of non-magnetic material and which can be detached from and towed by the carrier at a distance.

Vehicles that are suitable for carrying out the method are either the motor car or the airplane. The motor car has the advantage of low operating costs. On the other hand it has the disadvantage of being limited to the available roads which limits the survey.

When airplanes are used it is possible to survey magnetically large areas which are uninhabited and roadless. For this reason the magnetic survey which has heretofore been used almost exclusively for the more detailed examination of previously discovered deposits may be used as a highly reliable means of prospecting in the first instance.

In addition the general magnetic survey of a territory affords the great advantage that the maps obtained may be used for the geological mapping of such territory, particularly when it is desired to determine the contacts between different species of rock in areas where the overburden is thick.

In order that the irregularities or anomalies may clearly appear on the magnetogram the airplane must fly as close to the ground as possible. Naturally in doing so the view from the airplane is quite restricted and the maintenance of the airplane upon its course and the fixing of its position at a particular time becomes difficult. These difficulties are overcome by the proposed method wherein the airplanes used are divided into two groups having different functions. The planes carrying the magnetographs fly near the ground in a straight, oblique or any other suitable formation and each of them carries an automatic magnetograph. On the other hand the leader or guiding airplanes whose number may be less than that of the magnetograph carrying planes fly at a higher level and are provided with accurate navigational equipment. The formation of low flying airplanes is continuously photographed by aerial cameras in the leader airplanes.

The photographs taken fix at every moment the position of the magnetograph carrying airplanes relative to the ground. The height at which the flying takes place may be registered for instance by means of self recording barometers. However the fixation of the position of the magnetograph carrying airplanes is not yet sufficient.

The most important task is how to determine what points on the magnetogram correspond to the aerial photograph taken. In order to accomplish this each time the camera is exposed radio waves are transmitted which are recorded directly onto the magnetogram, thereby connecting the magnetogram with the corresponding aerial photograph and thereby connecting the magnetogram with specific observation points on the earth's surface. The synchronization of specific points on the magnetogram with photographs may of course be realized in other suitable ways but it is believed that the above described method is the simplest.

The number of magnetograph carrying airplanes employed will depend on the size of the area to be examined and on the traverse density desired for the network of observations. The height at which the leader airplanes fly is chosen in order to permit the exact fixation of the position of the magnetograph carrying airplanes relative to the ground. Such flying height must be exactly fixed and controlled by careful navigation and the leader airplanes may then control the course of the magnetograph carrying planes by radio telephony.

Figure 1:
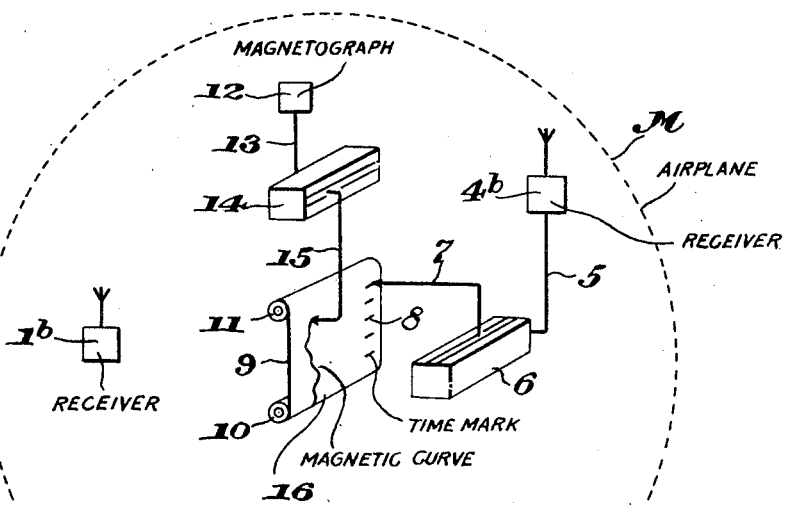

In the accompanying drawing Figs. 1 and 2 show the carrying out of the invention schematically.

In Fig. 1 the airplane formation is shown, in which three airplanes $M_1$, $M_2$, $M_3$ carrying the magnetographs are flying at a lower level near the earth surface E. Over these airplanes flies the leader airplane L. In Fig. 2 the function of the airplane system is indicated in detail. L indicates the leader plane with its apparatus and M one of the lower planes with its measuring devices. The observer of the leader plane follows (with his eyes) at all times the ground as well as the formation of the magnetograph planes. The observer gives primarily instructions to the pilot of the leader plane if the route of the leader plane should not remain correct. Further the observer by radio-transmitter $1a$ of leader plane and receiver $1b$ of magnetograph plane—continuously gives the pilots of the magnetograph planes instructions, so that they may maintain the internal distances between the formation planes constant and the flying direction correct. The aerial photograph camera 2 takes photographs of the earth ground with small time intervals. Each time the camera exposes, it simultaneously actuates a transmitter $4a$ along a line 3, which transmitter sends a short wave impulse at the exposing moment. The receiver $4b$ in the magnetograph plane M receives the impulses and amplifies them. The amplifier impulses go along the line 5 to the recording device 6, the indicator 7 of which makes a time mark 8 on the record band 9. The record hand moves over rolls 10 and 11. The indicator 15 of the recording device 14 which by the line 13 is connected to the magnetograph 12 indicates on the same recording band 9 a continuous curve 16 of the magnetic variations of the earth field.

It is obvious that the number of leading airplanes and magnetograph planes may be varied.

The above method is a preferred method but it is understood that all methods for carrying out the invention are included as will fall within the spirit and scope of the following claims.

We claim:

1. A method of magnetic surveying comprising flying an airplane carrying an automatic magnetograph over the surface of the earth to be surveyed, controlling the course of said airplane from an airplane flying at a higher level, photographing said magnetograph carrying airplane relative to said surface at frequent time intervals from said airplane at a higher level and recording the moments of the photographic exposures on the magnetogram produced by said magnetograph by radio impulses transmitted from said airplane at a higher level thereby fixing the magnetogram with relation to said surface.

2. A method of magnetic surveying comprising flying a formation of airplanes carrying magnetographs over and near the area of the earth's surface to be surveyed, flying a leader formation above said first formation along a predetermined course, controlling the course of said first formation from said leader formation, photographing said first formation from said leader formation at short time intervals to record the position of the airplanes in said first formation relative to said surface and recording the moments of the photographic exposures on the magnetograms produced by said magnetographs by radio impulses transmitted from said leader formation thereby fixing the magnetograms with relation to said surface.

MAUNU PURANEN.
AARNO ASSAR KAHMA.

REFERENCES CITED

The following references are of record in the file of this patent:

UNITED STATES PATENTS

| Number | Name | Date |
|---|---|---|
| 1,331,978 | Brock et al. | Feb. 24, 1920 |
| 1,650,978 | Boykow | Nov. 29, 1927 |
| 1,658,537 | Reinhold | Feb. 7, 1928 |
| 1,912,485 | Kothny | June 6, 1933 |
| 2,105,247 | Jakosky | Jan. 11, 1938 |
| 2,177,135 | Fassel | Oct. 24, 1939 |
| 2,406,870 | Vacquier | Sept. 3, 1946 |

OTHER REFERENCES

"Geophysical Mapping from the Air," by Heiland, in Eng. & Min. Journal, December 1935, pages 609–610.